United States Patent
Newman et al.

(10) Patent No.: US 10,827,036 B2
(45) Date of Patent: Nov. 3, 2020

(54) VERSION CONTROL MACHINE

(71) Applicant: Palantir Technologies Inc., Palo Alto, CA (US)

(72) Inventors: Jared Newman, Palo Alto, CA (US); Grace Wang, New York, NY (US); Benjamin Duffield, New York, NY (US); Jimin Song, Jersey City, NJ (US); Robert Fink, Palo Alto, CA (US); Mark Elliot, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 257 days.

(21) Appl. No.: 15/479,395

(22) Filed: Apr. 5, 2017

(65) Prior Publication Data

US 2018/0084086 A1    Mar. 22, 2018

Related U.S. Application Data

(60) Provisional application No. 62/396,689, filed on Sep. 19, 2016.

(51) Int. Cl.
*G06F 15/16* (2006.01)
*H04L 29/06* (2006.01)
(Continued)

(52) U.S. Cl.
CPC ............... *H04L 67/42* (2013.01); *G06F 8/71* (2013.01); *H04L 41/0893* (2013.01);
(Continued)

(58) Field of Classification Search
CPC ....... G06F 8/71; G06F 16/2365; H04L 67/02; H04L 67/42; H04L 67/1095; H04L 41/0893; H04L 67/26
(Continued)

(56) References Cited

U.S. PATENT DOCUMENTS

| | | | | |
|---|---|---|---|---|
| 7,653,733 B2 * | 1/2010 | Beyda | ................ | G06F 21/6218 709/203 |
| 8,656,453 B2 * | 2/2014 | Punnoose | ............... | H04L 63/20 726/1 |

(Continued)

OTHER PUBLICATIONS

"Adding start time to slow log messages", URL: https://github.com/palantir/atlasdb/, (accessed Apr. 27, 2018), 3 pages.
(Continued)

*Primary Examiner* — Dustin Nguyen
*Assistant Examiner* — Hao H Nguyen
(74) *Attorney, Agent, or Firm* — Schwegman Lundberg & Woessner, P.A.

(57) ABSTRACT

Aspects of the present disclosure relate to version control. A version control server receives, from a client device, a request for making changes to a portion of data stored in a data store. The version control server verifies that the client device has permission to make the changes to the portion of the data stored in the data store. The version control server updates, using a version control servlet, the data store according to the request. The version control sever creates, forks, merges or deletes, using a repository management API (application programming interface), a repository and/or the files in the repository in the data store based on the request. The version control server triggers, using the repository management API, one or more webhooks in response to the request.

17 Claims, 5 Drawing Sheets

(51) Int. Cl.
*G06F 8/71* (2018.01)
*H04L 12/24* (2006.01)
*H04L 29/08* (2006.01)

(52) U.S. Cl.
CPC .......... *H04L 67/02* (2013.01); *H04L 67/1095* (2013.01); *H04L 67/26* (2013.01)

(58) Field of Classification Search
USPC ............... 709/203, 205, 207, 217, 219, 229; 707/602, 607, 705, 706, 709, 758, 769; 717/100–103, 106, 120, 122
See application file for complete search history.

(56) References Cited

U.S. PATENT DOCUMENTS

| | | | | |
|---|---|---|---|---|
| 8,954,379 | B2* | 2/2015 | Carter | G06F 16/958 707/608 |
| 2001/0056463 | A1* | 12/2001 | Grady | G06Q 10/10 709/203 |
| 2006/0026251 | A1* | 2/2006 | Cheng | G06Q 10/10 709/207 |
| 2007/0250574 | A1* | 10/2007 | Tseitlin | H04L 67/40 709/205 |
| 2010/0058294 | A1* | 3/2010 | Best | G06F 8/71 717/122 |
| 2010/0313029 | A1* | 12/2010 | Abeln | G06F 9/44526 713/176 |
| 2012/0124547 | A1* | 5/2012 | Halbedel | G06F 16/903 717/100 |
| 2014/0067925 | A1* | 3/2014 | Strong | G06F 16/182 709/203 |
| 2014/0129936 | A1* | 5/2014 | Richards | G06F 21/6218 715/716 |
| 2014/0280484 | A1* | 9/2014 | Klemenz | H04L 67/02 709/203 |
| 2014/0297713 | A1* | 10/2014 | Meigen | G06F 8/20 709/203 |
| 2017/0322991 | A1* | 11/2017 | Tran | G06F 16/258 |
| 2017/0359379 | A1* | 12/2017 | Elliot | G06F 21/60 |
| 2017/0366621 | A1* | 12/2017 | Sagar | H04L 51/02 |
| 2018/0005538 | A1* | 1/2018 | Rockett | G06F 16/26 |

OTHER PUBLICATIONS

"AWS CodeCommit: Managed Source Control Service", URL: https://aws.amazon.com/codecommit/, (accessed Apr. 27, 2018), 4 pages.
"Git Internals: Transfer Protocols", URL: https://git-scm.com/book/en/v2/Git-Internals-Transfer-Protocols, (accessed Apr. 27, 2018), 9 pages.
"Git Internals: Transfer Protocols—The Smart Protocol", URL: https://git-scm.com/book/en/v2/Git-Internals-Transfer-Protocols#The-Smart-Protocol, (accessed Apr. 27, 2018), 9 pages.
"GitHub: DfsRepository—Fix javadoc in org.eclipse.jgit dfs package", URL: https://github.com/eclipse/jgit/blob/master/org.eclipse.jgit/src/org/eclipse/jgit/internal/storage/dfs/DfsRepository.java, (Dec. 19, 2017), 3 pages.
"GitHub: PreReceiveHook—Fix javadoc in org.eclipse.jgit transport package", URL: https://github.com/eclipse/jgit/blob/master/org.eclipse.jgit/src/org/eclipse/jgit/transport/PreReceiveHook.java, (accessed Apr. 27, 2018), 2 pages.
"Github: RepositoryResolver—Fix javadoc in org.eclipse.jgit transport package", URL: https://github.com/eclipse/jgit/blob/master/org.eclipse.jgit/src/org/eclipse/jgit/transport/resolver/RepositoryResolver.java, (accessed Apr. 27, 2018), 2 pages.
"Github: The world's leading software development platform", URL: https://github.com/, (2018), 6 pages.
"GitLab: Concurrent DevOps", URL: https://about.gitlab.com/, (Apr. 22, 2018), 5 pages.
"Gogs: A painless self-hosted Git service", URL: https://gogs.io/, (accessed Apr. 27, 2018), 4 pages.
"Introducing DGit—GitHub Engineering", URL: https://githubengineering.com/introducing-dgit/, (Apr. 5, 2016), 9 pages.
"Ketch: Basic Replication System—git.eclipse Code Review", URL: https://git.eclipse.org/r/#/c/64206/, (Jan. 20, 2016), 11 pages.
"RefDatabase: Introduce getAllRefs method—GitHub DFS Garbage Collector", URL: https://github.com/eclipse/jgit/blob/master/org.eclipse.jgit/src/org/eclipse/jgit/internal/storage/dfs/DfsGarbageCollector.java, (accessed Apr. 27, 2018), 12 pages.
"Stemma: Palantir's Distributed Git Server", URL: https://medium.com/@palantir/stemma-distributed-git-server-70afbca0fc29, (Sep. 26, 2016), 9 pages.
"Stemmatics: Overview", URL: https://en.wikipedia.org/wiki/Textual_criticism#Stemmatics, (accessed Apr. 27, 2018), 13 pages.
"Webhooks: GitHub Developer Guide", URL: https://developer.github.com/webhooks/, (accessed Apr. 27, 2018), 7 pages.
Pearce, Shawn, "Scaling Up JGit", URL: https://www.eclipsecon.org/2013/sites/eclipsecon.org.2013/files/Scaling%20Up%20JGit%20-%20EclipseCon%202013.pdf, (accessed Apr. 27, 2018), 18 pages.

* cited by examiner

VERSION CONTROL MACHINE

PRIORITY CLAIM

This application claims priority to U.S. Provisional Patent Application No. 62/396,689, filed on Sep. 19, 2016, entitled "VERSION CONTROL MACHINE," the entire content of which is incorporated herein by reference.

RELATED APPLICATIONS

This application relates to U.S. patent application Ser. No. 15/204,866, filed on Dec. 28, 2015, entitled "NETWORK-BASED PERMISSIONING SYSTEM," the entire content of which is incorporated herein by reference. This application relates to U.S. patent application Ser. No. 15/298,473, filed on Oct. 20, 2016, entitled "TRANSFORMING INSTRUCTIONS FOR COLLABORATIVE UPDATES," the entire content of which is incorporated herein by reference.

TECHNICAL FIELD

The subject matter disclosed herein relates to a machine for version control. In particular, example embodiments may relate to a version control server.

BACKGROUND

In some cases, version control systems are used for software development to allow multiple users to work collaboratively with source code. Multiple version control solutions exist on the market today. However, a version control solution that is highly available and capable of being integrated with external services may be desirable.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
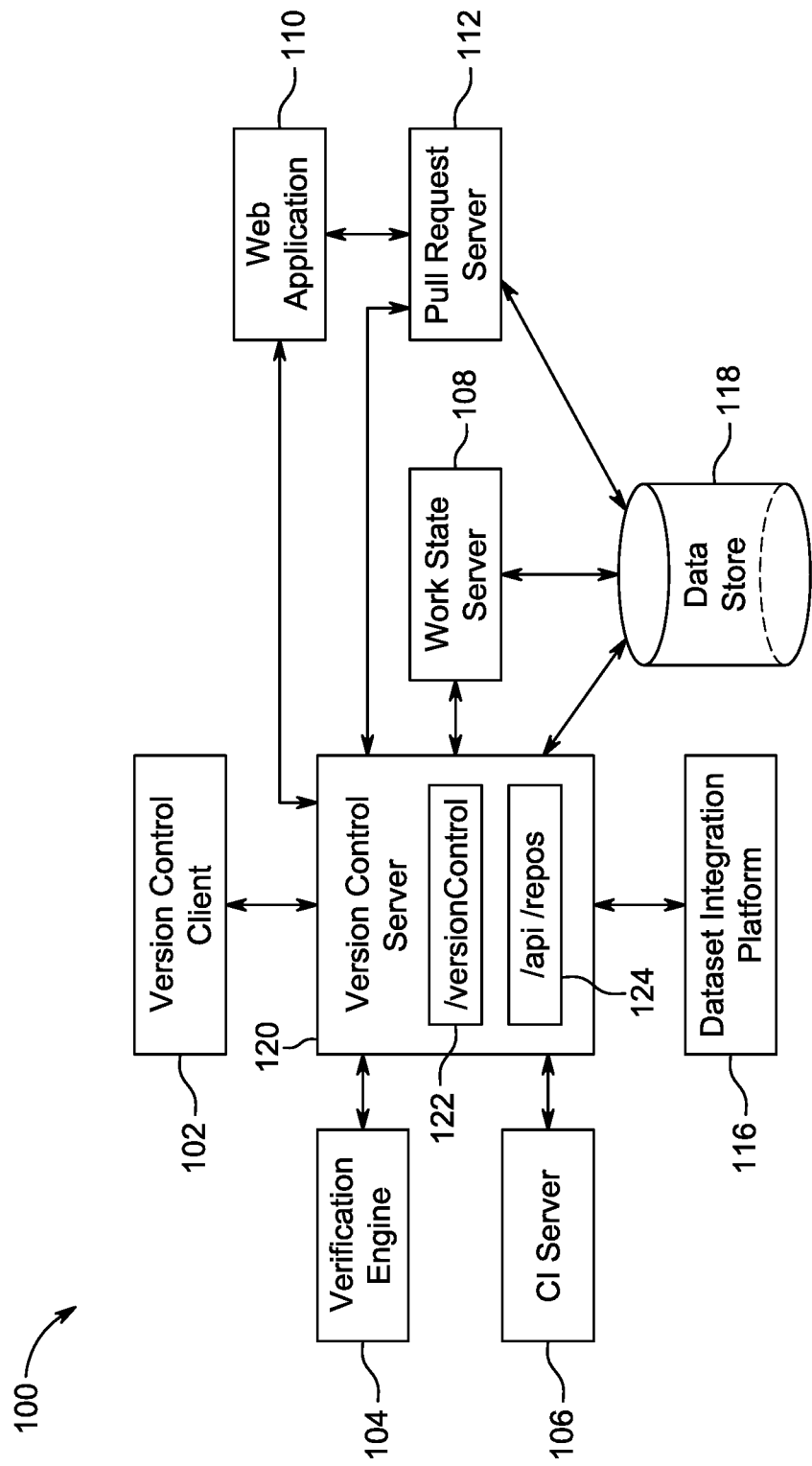
FIG. 1 illustrates an example system in which version control may be implemented, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the subject technology are directed to a version control server that is highly available and capable of being integrated with external services. The version control server may implement the application programming interface (API) of a version control system, such as git. The version control server allows for multiple users to work collaboratively with the same source code. The users may access the source code from different machines and, in some cases, two or more users may access the same source code simultaneously. The version control server may be highly available (e.g., at least 99.999% available or having an availability exceeding some other predefined threshold) for access by other machines. In some embodiments, high availability (HA) is obtained by using the primitives of a transactional highly available key-value store. The key-value store is used to store the object database responsible for the version control repository. The version control server may be integrated with external services, allowing users to define custom actions in response to push events to a code repository. According to some embodiments, read access is restricted at the repository level, and write access is restricted at the reference (ref) level. According to some embodiments, the version control server has policy based security. According to some embodiments, the version control server provides the functionalities of: versioning and managing code, and code review changes.

According to some implementations, a version control server accesses (e.g., serves) a version control repository that stores blobs (binary large objects), trees, and commits. A blob (binary large object) is the content of a file. The blob lacks a proper file name, a time stamp, or other metadata. A blob's name internally is a hash of its contents. A tree is similar to a directory. It contains a list of file names and a reference to a blob or tree object that is the file, symbolic link, or directory contents. A commit object links tree objects together in a history. It contains the name of the tree object (of the top-level source directory), a time stamp, a log message, and the names of zero or more parent commit objects. Version control may be implemented using any protocol. According to some examples, version control is obtained by implementing the git protocol over HTTPS (hypertext transfer protocol secure). Alternatively, version control is obtained by implementing the git protocol over SSH (secure shell) or simple HTTP (hypertext transfer protocol).

FIG. 1 illustrates an example system 100 in which version control may be implemented, according to some embodiments. As shown, the system 100 includes a version control client 102, a verification engine 104, a CI (continuous integration) server 106, a work state server 108, a web application 110, a pull request server 112, a dataset integration platform 116, a data store 118, and a version control server 120.

The version control client 102 may include one or more of a desktop computer, a laptop computer, a mobile phone, a tablet computer, a personal digital assistant (PDA), a smart watch, and the like. In some examples, the version control client is used to create or edit file(s) for storage in the data store 118.

Each of the verification engine 104, the CI server 106, the work state server 108, the web application 110, the pull request server 112, and the dataset integration platform 116 may reside on one or more of a physical machine (e.g., the machine described in FIG. 5), a virtual machine, or the cloud.

In some embodiments, the version control server 120 includes a version control servlet /versionControl 122 and a repository management API (application programming interface) /api/repos 124. The version control servlet /versionControl 122 services all requests from the version control client 102 (e.g., git clone, git pull, and git push if the git protocol is implemented by the version control server 120). In some examples, the version control servlet /versionControl 122 implements a git-like protocol using HTTPS. The repository management API /api/repos 124 includes meta-APIs, for example, a repository creation/deletion API and a webhooks API.

Upon receiving a request from the version control client 102, the version control server 120 verifies, using a verification engine 104, that the version control client 102 has permission to access (e.g., read or write) the data in the request. In some cases, in the verification engine 104, read access is restricted at a repository level and write access is restricted at a ref level. Upon verifying that the version control client 102 has access to the data in the request, the version control server 120 accesses the data store 118 to carry out the request. The data store 118 may be implemented using a key-value store, a relational database or any other data storage technique. The data store 118 is highly available. In some implementations, the data store 118 is transactional.

In some aspects, the data store 118 implements network-based permissioning for files stored therein. Data stored in the data store (e.g., blobs, commit logs, trees) has a related access permission, which allows implementation of policy-based security. Network-based permissioning is described in U.S. patent application Ser. No. 15/204,866, filed on Dec. 28, 2015, entitled "NETWORK-BASED PERMISSIONING SYSTEM," the entire content of which is incorporated herein by reference. Network-based permissioning is advantageous because it allows for different users to have multiple different types of access permissions to files in the data store 118.

The repository management API /api/repos 124 allows a user of the version control client 102 to create and delete repositories using the repository creation/deletion API. The repository management API /api/repos 124 allows a user of the version control client 102 to fork repositories and to merge forked repositories. The repository management API /api/repos 124 provides webhooks using the webhooks API. According to some examples, a webhook includes a user-defined HTTP callback that is triggered by an event, such as pushing code into the data store 118. According to other examples, a webhook is received via an HTTPS server. The version control server 120 can manage and hold source code that can be compiled, used or otherwise accessed by other applications. For example, the version control server 120 can communicate, using the repository management API /api/repos 124, with a dataset integration platform 116. The dataset integration platform 116 may, for example, provide a platform for integrating, managing, and interacting with data from different sources and formats. On the back end, the dataset integration platform 116 provides a single, flexible repository for all data. On the front end, the dataset integration platform 116 provides a user interface that enables browsing, tracking, analyzing, and organizing of datasets, where each dataset is a container for files and semantically related content. In one example, a dataset includes a stream of files emitted by a particular data source.

One example webhook communicates with the CI server 106. The CI server 106 takes the user code, builds artifacts, publishes those artifacts (e.g., to Maven) and then registers new job descriptions in the dataset integration platform 116 referencing those published artifacts.

Aspects of the subject technology include a web application 110 for the version control server 120. The web application may reside at a client device, for example, the version control client 102 or another client device, such as a desktop computer, a laptop computer, a mobile phone, a tablet computer, a personal digital assistant (PDA), a smart watch, and the like. The web application 110 communicates with the version control server 120. The web application 110 allows a user to browse repository contents and run basic searches by filename from the web application 110.

The work state server 108 allows a user to edit repositories. In some cases, the work state server 108 takes the primitives of a highly available version control repository and uses them to provide highly available work states. The work state server 108 communicates directly with the data store 118 and with the version control server 120. The work state server 108 is configured to store a state of file(s) from the data store 118 that are being modified by a user in a highly available manner. The work state server 108 may be used in code editing. In some cases, when a user is working on a first repository of the data store 118 via the work state server 108, the first repository may be forked (with the previous version stored in one branch and the user's changes in another branch). In some cases, the work state server 108 creates pointers or references to data instead of copying the data. A previous version of data may include pointers or references to changes that were made in a new version of the data. In some cases, the work state server 108 stores a string of mutation instead of explicitly saving changes that were made to data. In some cases, operational transforms are used to enable simultaneous collaborative editing of files.

The work state server 108 has high availability because of the HA version control repository, which in turn relies on the HA data store (e.g., data store 118). The work state server 108 also directly interacts with the HA data store.

In some cases, it is very expensive to copy every file in a repository to create a new branch or fork, or a copy that a developer can use as a local working copy. Instead of copying every file, the work state server 108 creates a new branch, fork, or local working copy by creating a set of pointers or references to the data. As long as the files are not changed in this repository, there is no need to create a new version of the files. Alternatively, the work state server stores all of the changes as a string of mutations (e.g., insert "printf" at the beginning of line 4, delete "open( )" which is on line 10 between characters 1-6). Some techniques for having users simultaneously edit the same files in a shared network environment are described in U.S. patent application Ser. No. 15/298,473, filed on Oct. 20, 2016, entitled "TRANSFORMING INSTRUCTIONS FOR COLLABORATIVE UPDATES," the entire content of which is incorporated herein by reference. These techniques may be implemented at the work state server 108.

The pull request server 112 stores pull requests that have been made on the data store 118, metadata about the pull requests (e.g., when created, author, and the like). In some cases, a user interface for accessing the pull requests of the pull request server 112 is provided by the web application 110.

In one example workflow, the version control client 102 pushes new software code to the version control server 120. The version control server 120 verifies, using the verification engine 104, that the version control client 102 has permission to push the new software code. The version control servlet /versionControl 122 stores the new objects from the new software code that are sent in the data store 118. The repository management API /api/repos 124 of the version control server 120 updates (e.g., by triggering a webhook) the dataset integration platform 116 based on the new objects in the data store 118. The push of the new software code causes the version control server 120 to trigger a CI webhook, which triggers the CI server 106. In response to the trigger, the CI server 106 builds artifacts from the code at that point in time (e.g., based on the new objects in the data store 118). The CI server 106 notifies the dataset integration platform 116 about the new artifacts.

In another example workflow, the web application 110 is used to make a pull request. The web application 110 provides the pull request to the pull request server 112, where others (e.g., teammate(s) or supervisor(s) of the person making the pull request) may comment on the pull request. Once the pull request is approved, the web application 110 is used to instruct the pull request server 112 to merge the pull request into the data store 118. The pull request server 112 provides instructions to the version control server 120 to merge the pull request into the data store 118. After the version control server 120 merges the pull request, the version control server 120 provides, to the pull request server 112 and to the web application 110, a notification that the pull request has been merged. In some embodiments, policy based security is used so that, for certain protocol branches, only the pull request server 112 and not the version control client 102 has the ability to merge into those protocol branches.

Figure 2:
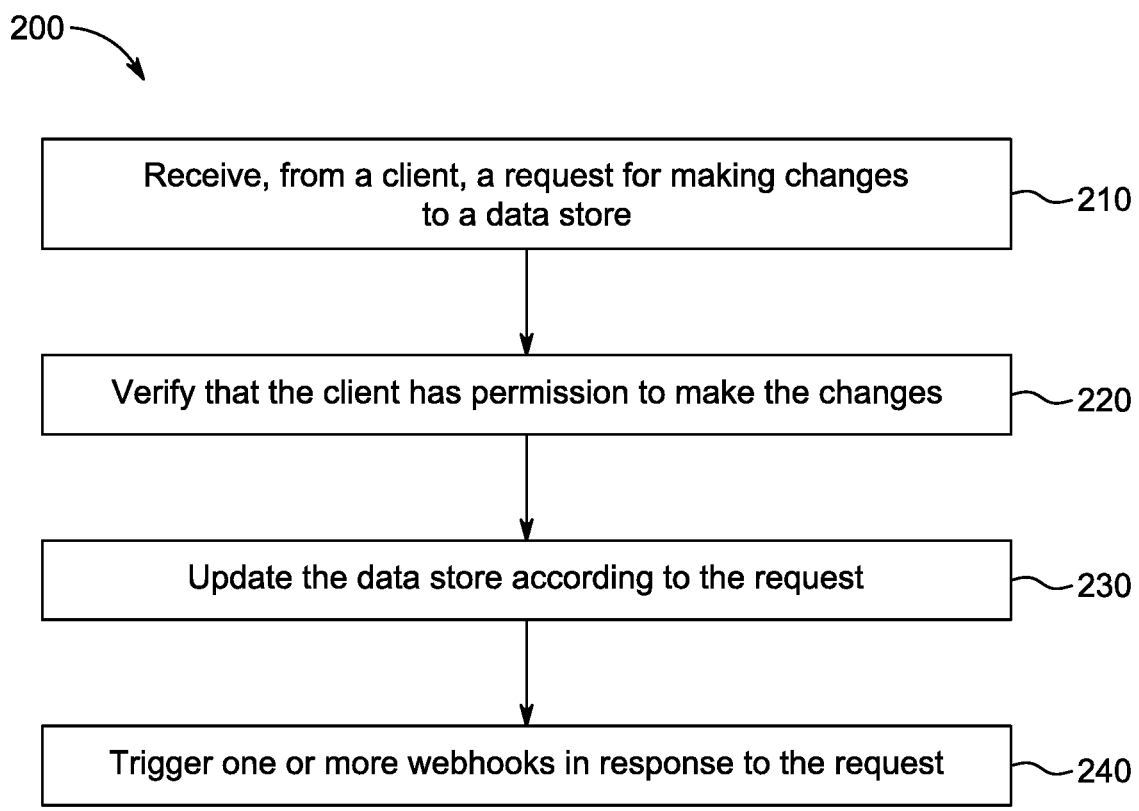
FIG. 2 is a flow chart of an example method for making changes to a data store, according to some embodiments.

FIG. 2 is a flow chart of an example method 200 for making changes to a data store, according to some embodiments. The method 200 may be embodied in computer-readable instructions for execution by one or more processors such that the operations of the method 200 may be performed in part or in whole by the version control server 120. Accordingly, the method 200 is described below by way of example with reference thereto. However, it shall be appreciated that at least some of the operations of the method 200 may be deployed on various other hardware configurations and the method 200 is not intended to be limited to the version control server 120.

At operation 210, the version control server 120 receives, from the version control client 102, a request for making changes to the data store 118. The request may include one or more of a clone request, a pull request, and a push request.

At operation 220, the version control server 120 verifies, using the verification engine 104, that the version control client has permission to make the changes to the data store 118.

At operation 230, the version control server 120 updates, using the version control servlet /versionControl 122, the data store according to the request.

At operation 240, the version control server 120 triggers, using the repository management API /api/repos 124, one or more webhooks in response to the request. A webhook may include a user-defined HTTP callback triggered by an event. Alternatively, the callback may be in a protocol other than HTTP. The event may include, among other things, making changes to the data store. In some embodiments, the one or more webhooks include a CI webhook. The CI webhook triggers the CI server 106. In response to the trigger, the CI server 106 builds artifacts from the code at that point in time (e.g., based on the new objects in the data store 118). The CI server 106 notifies the dataset integration platform 116 about the new artifacts. In some embodiments, the one or more webhooks include a dataset integration webhook, which causes an update to the dataset integration platform 116 based on the request.

In some cases, the work state server 108 is coupled with the version control server 120 and the data store 118. The work state server 108 determines that file(s) from the data store 118 are being modified and stores the state of the file(s) that are being modified in a highly available manner. The one or more files may be modified by the request of operation 210.

Figure 3:
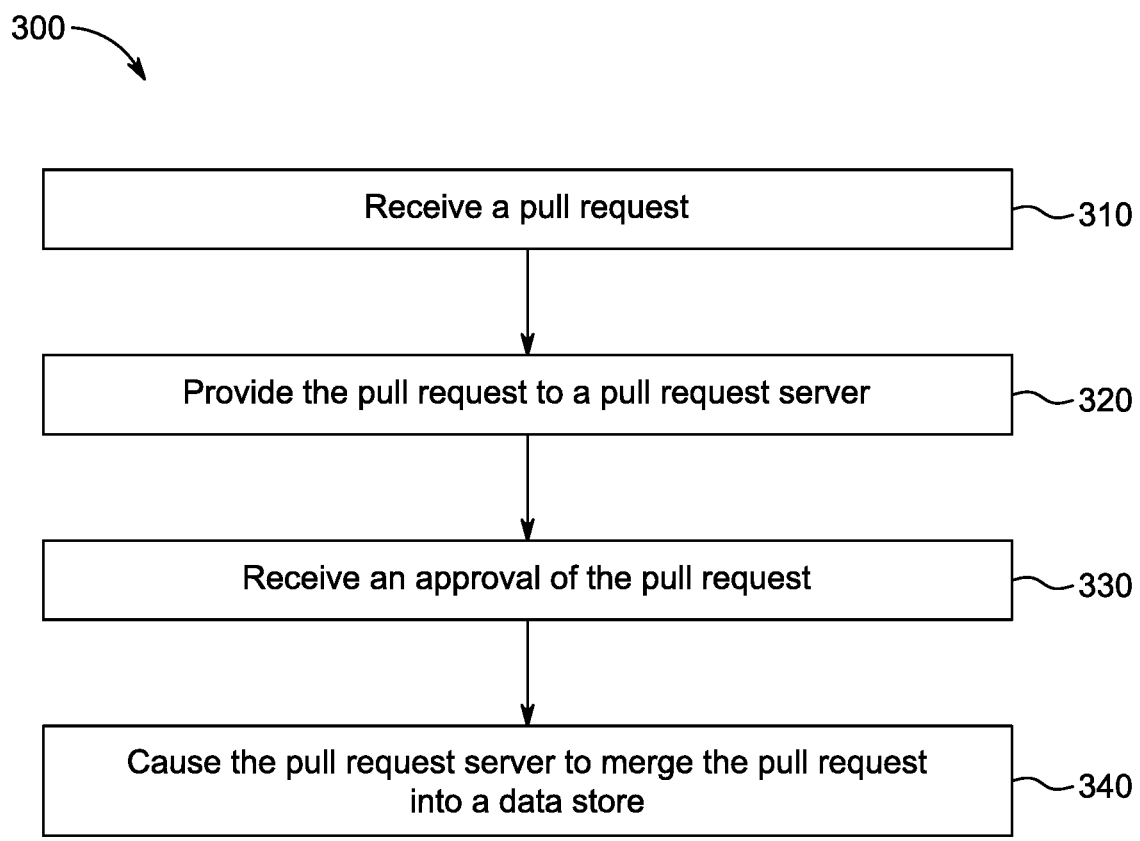
FIG. 3 is a flow chart of an example method for processing a pull request, according to some embodiments.

FIG. 3 is a flow chart of an example method 300 for processing a pull request, according to some embodiments. The method 300 may be embodied in computer-readable instructions for execution by one or more processors such that the operations of the method 300 may be performed in part or in whole by the web application 110 or a machine storing the web application 110. Accordingly, the method 300 is described below by way of example with reference thereto. However, it shall be appreciated that at least some of the operations of the method 300 may be deployed on various other hardware configurations and the method 300 is not intended to be limited to the web application 110.

At operation 310, the web application 110, which resides at a first client device, receives, from a user, a pull request. The pull request may include change(s) to file(s) in the data store 118. The web application is communicatively coupled (e.g., capable of communicating) with the version control server 120 and the pull request server 112.

At operation 320, the web application 110 provides the pull request to the pull request server 112. For example, the web application 110 the web application may provide the pull request to the pull request server 112 by making an API call.

At operation 330, the web application 110 or the pull request server 112 receives an approval of the pull request from a second computing device different from the first computing device. For example, a user (e.g., a supervisor of a user of the first computing device) operating the second computing device may provide the approval using the second computing device.

At operation 340, the web application 110 or the pull request server 112 provides, in response to the approval of the pull request, an instruction to the pull request server 112, which causes the pull request server 112 to merge the pull request into the data store 118. The pull request server 112 merges the pull request into the data store 118.

Figure 4:
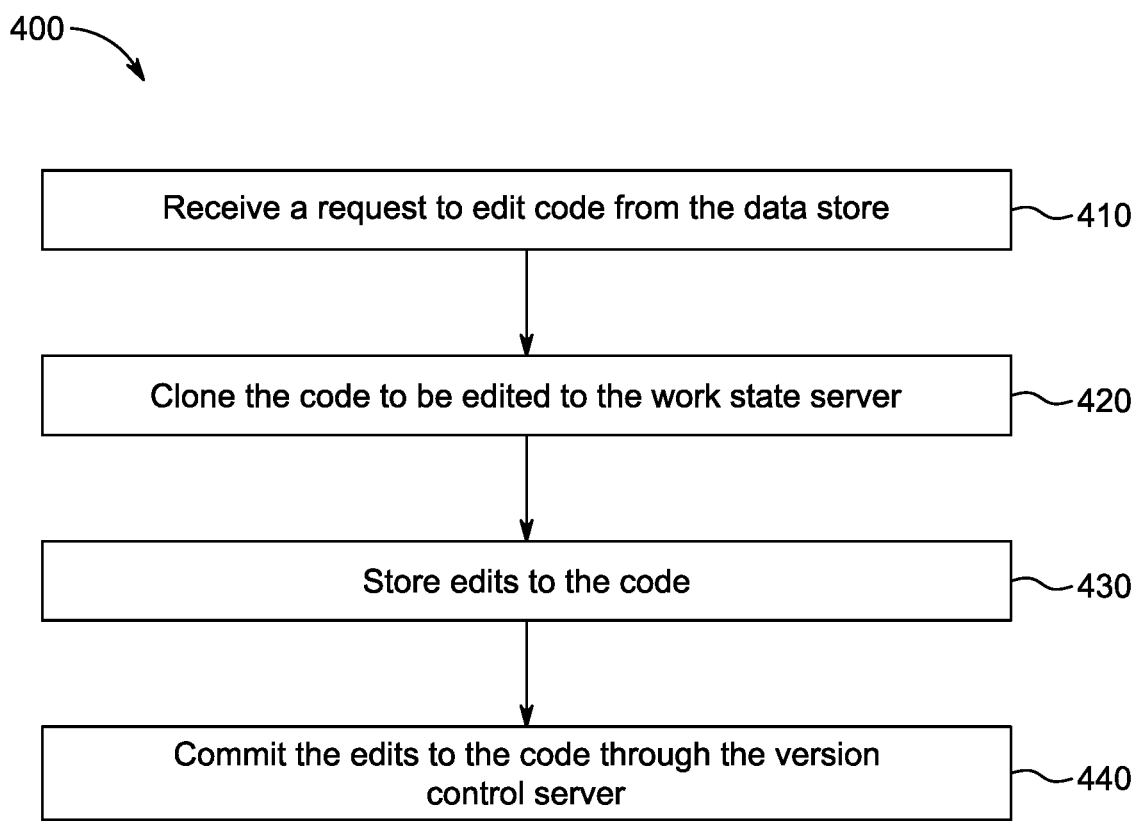
FIG. 4 is a flow chart of an example method for editing code in a data store, according to some embodiments.

FIG. 4 is a flow chart of an example method 400 for editing code in a data store, according to some embodiments. The method 400 may be implemented at the work state server 108.

At operation 410, the work state server 108 receives a request to edit code from the data store 118. The request may be received from the version control client 102 or the web application 110 via the version control server 120.

At operation 420, the work state serve 108 clones the code to be edited to the work state server 108.

At operation 430, the work state server 108 stores edits to the code, received from the version control client 102 or the web application 110, at data store 118. The work state server 108 is HA because it relies on the HA data store 118.

At operation 440, the work state server 108 commits the edits to the code through version control server 120, which then stores the commit objects, trees, and/or blobs at data store 118.

According to some examples, the data store 118 implements a network-based permissioning system. In the network-based permissioning system, each blob, tree, commit log, etc., is considered a data resource, and each data resource has associated permissions. A "data resource" as used herein may include any item of data or code (e.g., a data object) that can be used by one or more computer programs. In example embodiments, data resources are stored the data store 118 and are capable of being accessed by the other machines (e.g., version control client 102, version control server 120, work state server 108, web application 110, and pull request server 112) of FIG. 1.

According to some aspects, policies are registered to be associated with data resources. The policies define access permissions of a user or group of users with respect to a data resource. Techniques for registering and implementing the policies are described in U.S. patent application Ser. No. 15/204,866, filed on Dec. 28, 2015, entitled "NETWORK-BASED PERMISSIONING SYSTEM," the entire content of which is incorporated herein by reference.

Figure 5:
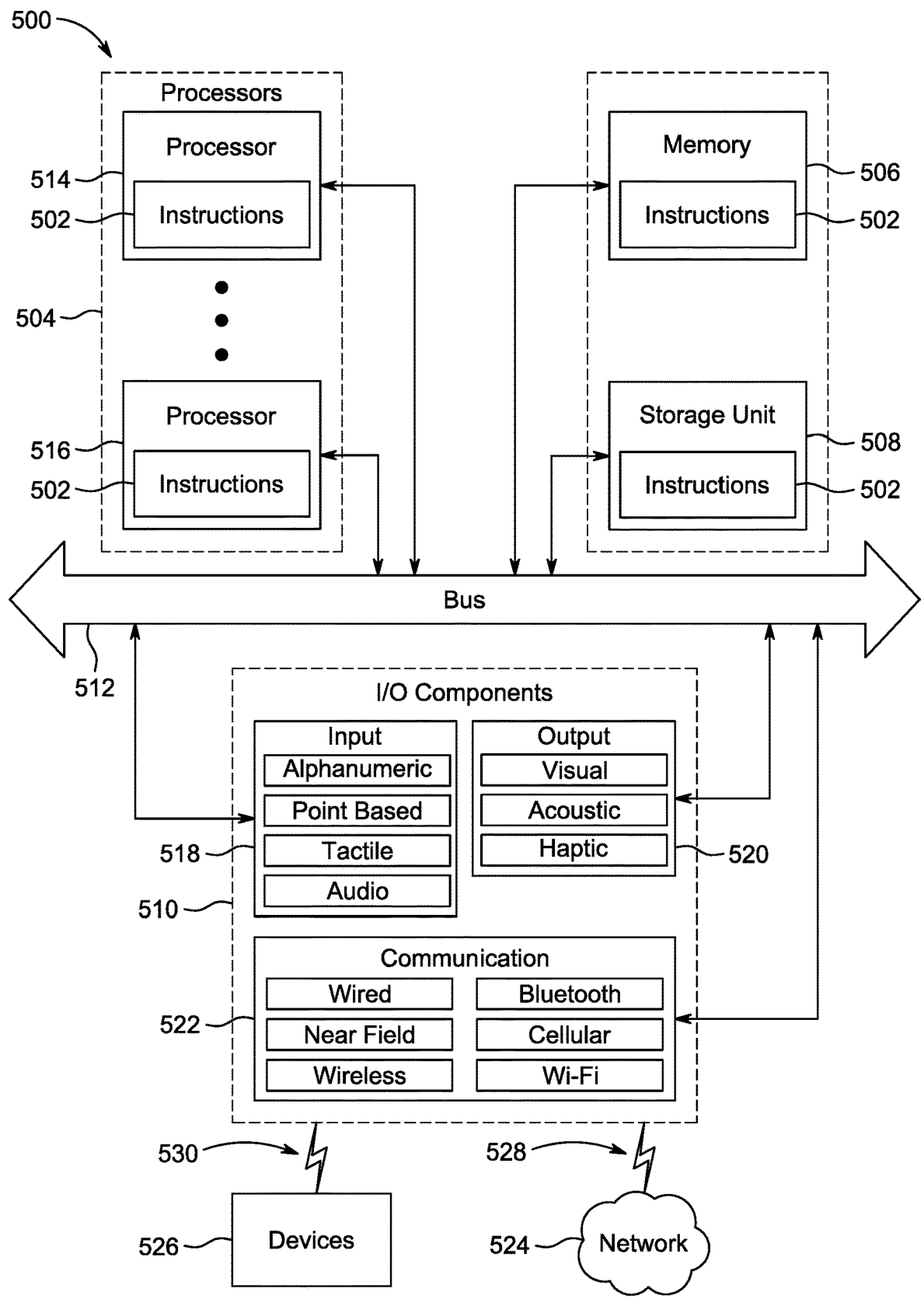
FIG. 5 is a block diagram illustrating components of a machine able to read instructions from a machine-readable medium, according to some embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. The machine 500 may correspond to one or more of the client device 210, the management server 220, or the map server(s) 230. Specifically, FIG. 5 shows a diagrammatic representation of the machine 500 in the example form of a system, within which instructions 502 (e.g., software, a program, an application, an applet, an app, a driver, or other executable code) for causing the machine 500 to perform any one or more of the methodologies discussed herein may be executed. For example, the instructions 502 include executable code that causes the machine 500 to execute the methods 200, 300, and 400. In this way, these instructions transform the general, non-programmed machine into a particular machine programmed to carry out the described and illustrated functions in the manner described herein. The machine 500 may operate as a standalone device or may be coupled (e.g., networked) to other machines.

By way of non-limiting example, the machine 500 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 502, sequentially or otherwise, that specify actions to be taken by machine 500. Further, while only a single machine 500 is illustrated, the term "machine" shall also be taken to include a collection of machines 500 that individually or jointly execute the instructions 502 to perform any one or more of the methodologies discussed herein.

The machine 500 may include processors 504, memory 506, storage unit 508 and I/O components 510, which may be configured to communicate with each other such as via a bus 512. In an example embodiment, the processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 514 and processor 516 that may execute instructions 502. The term "processor" is intended to include multi-core processors that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory 506 (e.g., a main memory or other memory storage) and the storage unit 508 are both accessible to the processors 504 such as via the bus 512. The memory 506 and the storage unit 508 store the instructions 502 embodying any one or more of the methodologies or functions described herein. The instructions 502 may also reside, completely or partially, within the memory 506, within the storage unit 508, within at least one of the processors 504 (e.g., within the processor's cache memory), or any suitable combination thereof, during execution thereof by the machine 500. Accordingly, the memory 506, the storage unit 508, and the memory of processors 504 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 502. The term "machine-readable medium" shall also be taken to include any medium, or combination of multiple media, that is capable of storing instructions (e.g., instructions 502) for execution by a machine (e.g., machine 500), such that the instructions, when executed by one or more processors of the machine 500 (e.g., processors 504), cause the machine 500 to perform any one or more of the methodologies described herein (e.g., methods 200, 300, and 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine will depend on the type of machine. For example, portable machines such as mobile phones will likely include a touch input device or other such input mechanisms, while a headless server machine will likely not include such a touch input device. It will be appreciated that the I/O components 510 may include many other components that are not specifically shown in FIG. 5. The I/O components 510 are grouped according to functionality merely for simplifying the following discussion and the grouping is in no way limiting. In various example embodiments, the I/O components 510 may include input components 518 and output components 520. The input components 518 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 510 may include communication components 522 operable to couple the machine 500 to a network 524 or devices 526 via coupling 528 and coupling 530, respectively. For example, the communication components 522 may include a network interface component or other suitable device to interface with the network 524. In further examples, communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 526 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors of a version control server; and
a machine-readable medium storing instructions which, when executed by the one or more processors, cause the version control server to:
receive, from a client device, a request for making changes to a portion of data stored in a data store, wherein the data store stores a plurality of objects;
verify that the client device has permission to make the changes to the portion of the data stored in the data store;
update the portion of the data stored in the data store according to the request by generating one or more new objects;
trigger one or more webhooks in response to the request, wherein the one or more webhooks comprise a continuous integration (CI) webhook, the CI webhook causing a CI server to build new artifacts from code, publish the new artifacts, and notify a dataset integration platform about the new published artifacts, wherein the new artifacts are built based on the one or more new objects; and
register, in the dataset integration platform, a new job description referencing one or more of the new published artifacts built via the CI webhook, wherein the dataset integration platform provides a user interface for browsing a plurality of datasets, wherein each dataset comprises a container for semantically related content, wherein at least one dataset from the plurality of datasets comprises a stream of files emitted by a particular data source;
a work state server coupled with the version control server and the data store, the work state server to:
receive, from the client device, a request to edit code from the data store;
clone the code to be edited to the work state server;
commit edits to the code to the work state server; and
push the edits to the code to the data store.

2. The system of claim 1, wherein the one or more webhooks comprise a dataset integration webhook, the dataset integration webhook causing an update to a dataset integration platform based on the request.

3. The system of claim 1, wherein the request comprises one or more of a clone request, a pull request, and a push request.

4. The system of claim 1, wherein at least one webhook from the one or more webhooks comprises a user-defined hypertext transfer protocol (HTTP) callback triggered by an event.

5. The system of claim 4, wherein the event comprises making the changes to the portion of the data stored in the data store.

6. The system of claim 1, further comprising a work state server coupled with the version control server and the data store, the work state server to:
determine that one or more files from the data store are being modified;
store one or more pointers to a previous version of the one or more files; and
store one or more pointers indicating modifications to the one or more files.

7. The system of claim 6, wherein the request received from the client device comprises the modifications to the one or more files.

8. The system of claim 1, the machine-readable medium further storing instructions which, when executed by the one or more processors, cause the version control server to:
receive, from the client device, an access request for a data resource stored in the data store, the access request including a resource identifier and a user identifier, the resource identifier identifying the data resource, the user identifier identifying a user of the network application;
in response to receiving the access request, access, from a verification engine, a policy object associated with the data resource using the resource identifier, the policy object including a statement, the statement including an operation performable with respect to the data resource based on satisfaction of one or more conditions;
evaluate, using the version control server, an access permission of the user with respect to the data resource based on whether the one or more conditions included in the policy record are satisfied; and
communicate, to the client device, a response to the access request, the response to the access request including the access permission of the user with respect to the data resource.

9. The system of claim 8, the machine-readable medium further storing instructions which, when executed by the one or more processors, cause the version control server to:

provide, to the client device, a user interface for registering a policy, the user interface including one or more input fields to receive a policy registration;
receive, from the client device, a policy registration associated with an additional data resource stored in the first network database, the policy registration including an additional resource identifier and a plurality of statements, the additional resource identifier identifying the additional data resource, each of the plurality of permission statements including a condition and an operation; and
register a policy associated with the additional data resource based on the policy registration.

10. A method comprising:
receiving, from a user, a pull request at a web application of a first computing device, the web application being communicatively coupled with a version control server and a pull request server;
providing, via the web application, the pull request to the pull request server;
receiving, at the web application, an approval of the pull request from a second computing device different from the first computing device; and
providing, in response to the approval of the pull request, a message to the pull request server, the message causing the pull request server to instruct the version control server to merge the pull request into a data store, the version control server to:
trigger one or more webhooks in response to the pull request, wherein the one or more webhooks comprise a continuous integration (CI) webhook, the CI webhook causing a CI server to build new artifacts from code, publish the new artifacts, and notify a dataset integration platform about the new published artifacts, wherein the new artifacts are built based on one or more new objects added to the data store according to the pull request; and
register, in the dataset integration platform, a new job description referencing one or more of the new published artifacts built via the CI webhook, wherein the dataset integration platform provides a user interface for browsing a plurality of datasets, wherein each dataset comprises a container for semantically related content, wherein at least one dataset from the plurality of datasets comprises a stream of files emitted by a particular data source; and
a work state server coupled with the version control server and the data store, the work state server to:
receive, from the client device, a request to edit code from the data store;
clone the code to be edited to the work state server;
commit edits to the code to the work state server; and
push the edits to the code to the data store.

11. The method of claim 10, further comprising: receiving, from the version control server, a notification that the pull request has been merged into the data store.

12. The method of claim 10, wherein the first computing device is separate and distinct from the version control server.

13. The method of claim 10, further comprising: browsing, via the web application, contents of a repository of the data store.

14. A non-transitory machine-readable medium storing instructions which, when executed by the one or more processors of a version control server, cause the version control server to perform operations comprising:

receiving, from a client device, a request for making changes to a portion of data stored in a data store, wherein the data store stores a plurality of objects;

verifying that the client device has permission to make the changes to the portion of the data stored in the data store;

updating the portion of the data stored in the data store according to the request by generating one or more new objects;

triggering one or more webhooks in response to the request, wherein the one or more webhooks comprise a continuous integration (CI) webhook, the CI webhook causing a CI server to build new artifacts from code, publish the new artifacts, and notify a dataset integration platform about the new published artifacts, wherein the new artifacts are built based on the one or more new objects; and register, in the dataset integration platform, a new job description referencing one or more of the new published artifacts built via the CI webhook, wherein the dataset integration platform provides a user interface for browsing a plurality of datasets, wherein each dataset comprises a container for semantically related content, wherein at least one dataset from the plurality of datasets comprises a stream of files emitted by a particular data source; and a work state server coupled with the version control server and the data store, the work state server to:
  receive, from the client device, a request to edit code from the data store;
  clone the code to be edited to the work state server;
  commit edits to the code to the work state server; and
  push the edits to the code to the data store.

15. The machine-readable medium of claim 14, wherein the one or more webhooks comprise a dataset integration webhook, the dataset integration webhook causing an update to a dataset integration platform based on the request.

16. The machine-readable medium of claim 14, wherein at least one webhook from the one or more webhooks comprises a user-defined hypertext transfer protocol (HTTP) callback triggered by an event.

17. The machine-readable medium of claim 16, wherein the event comprises making the changes to the portion of the data stored in the data store.

* * * * *